US011165347B2

(12) United States Patent
Leong et al.

(10) Patent No.: US 11,165,347 B2
(45) Date of Patent: Nov. 2, 2021

(54) INDUCTIVE COUPLED POWER SUPPLY AND SLOPE CONTROL

(71) Applicant: Infineon Technologies Austria AG, Villach (AT)

(72) Inventors: Kennith K. Leong, Villach (AT); Matthias J. Kasper, Villach (AT); Luca Peluso, Villach (AT); Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/655,398

(22) Filed: Oct. 17, 2019

(65) Prior Publication Data

US 2021/0119538 A1 Apr. 22, 2021

(51) Int. Cl.
*H02M 3/156* (2006.01)
*H02M 3/157* (2006.01)
*H02M 3/158* (2006.01)

(52) U.S. Cl.
CPC .......... *H02M 3/158* (2013.01); *H02M 3/1566* (2021.05)

(58) Field of Classification Search
CPC .............. H02M 3/156–158; H02M 2003/1566
See application file for complete search history.

(56) References Cited

U.S. PATENT DOCUMENTS

| 5,790,005 | A | * | 8/1998 | Santi | H01F 3/14 |
| | | | | | 335/296 |
| 6,822,427 | B2 | * | 11/2004 | Wittenbreder | H02M 1/34 |
| | | | | | 323/222 |
| 7,251,113 | B1 | * | 7/2007 | Batarseh | H02M 3/158 |
| | | | | | 361/111 |
| 10,804,798 | B1 | * | 10/2020 | Rizzolatti | H01F 29/025 |
| 2002/0136029 | A1 | * | 9/2002 | Ledenev | G06F 1/26 |
| | | | | | 363/16 |
| 2004/0080965 | A1 | | 4/2004 | Poon et al. | |
| 2007/0176585 | A1 | * | 8/2007 | He | H02M 3/1584 |
| | | | | | 323/282 |
| 2008/0019158 | A1 | * | 1/2008 | Wu | H02M 3/1584 |
| | | | | | 363/44 |
| 2009/0001945 | A1 | * | 1/2009 | Wickersham | H02M 3/1584 |
| | | | | | 323/263 |
| 2011/0169811 | A1 | * | 7/2011 | Nagaki | G09G 3/2965 |
| | | | | | 345/212 |
| 2014/0132237 | A1 | * | 5/2014 | Barnette | H02M 3/1584 |
| | | | | | 323/286 |
| 2017/0373592 | A1 | * | 12/2017 | Takahashi | H02M 3/156 |
| 2018/0152107 | A1 | * | 5/2018 | Childs | H02M 1/14 |

(Continued)

FOREIGN PATENT DOCUMENTS

CN 108900083 A 11/2018

OTHER PUBLICATIONS

EP Extended Search Report, EP 20201383.5, dated Feb. 25, 2021, pp. 10.

*Primary Examiner* — Sisay G Tiku
(74) *Attorney, Agent, or Firm* — Armsi IP Law, LLC

(57) ABSTRACT

A power supply includes a power source, a primary inductive path, and a secondary inductive path. The primary inductive path coupled to receive input current from the power source. The secondary inductive path is magnetically coupled to the primary inductive path to adjust current flow through the primary inductive path, the primary inductive path operable to produce an output voltage.

32 Claims, 11 Drawing Sheets

(56) References Cited

U.S. PATENT DOCUMENTS

2019/0280590 A1\* 9/2019 Lee ................. H02M 3/156
2019/0348912 A1\* 11/2019 Philip ............... H02M 3/157
2020/0358355 A1\* 11/2020 Zambetti .......... H02M 3/33569

\* cited by examiner

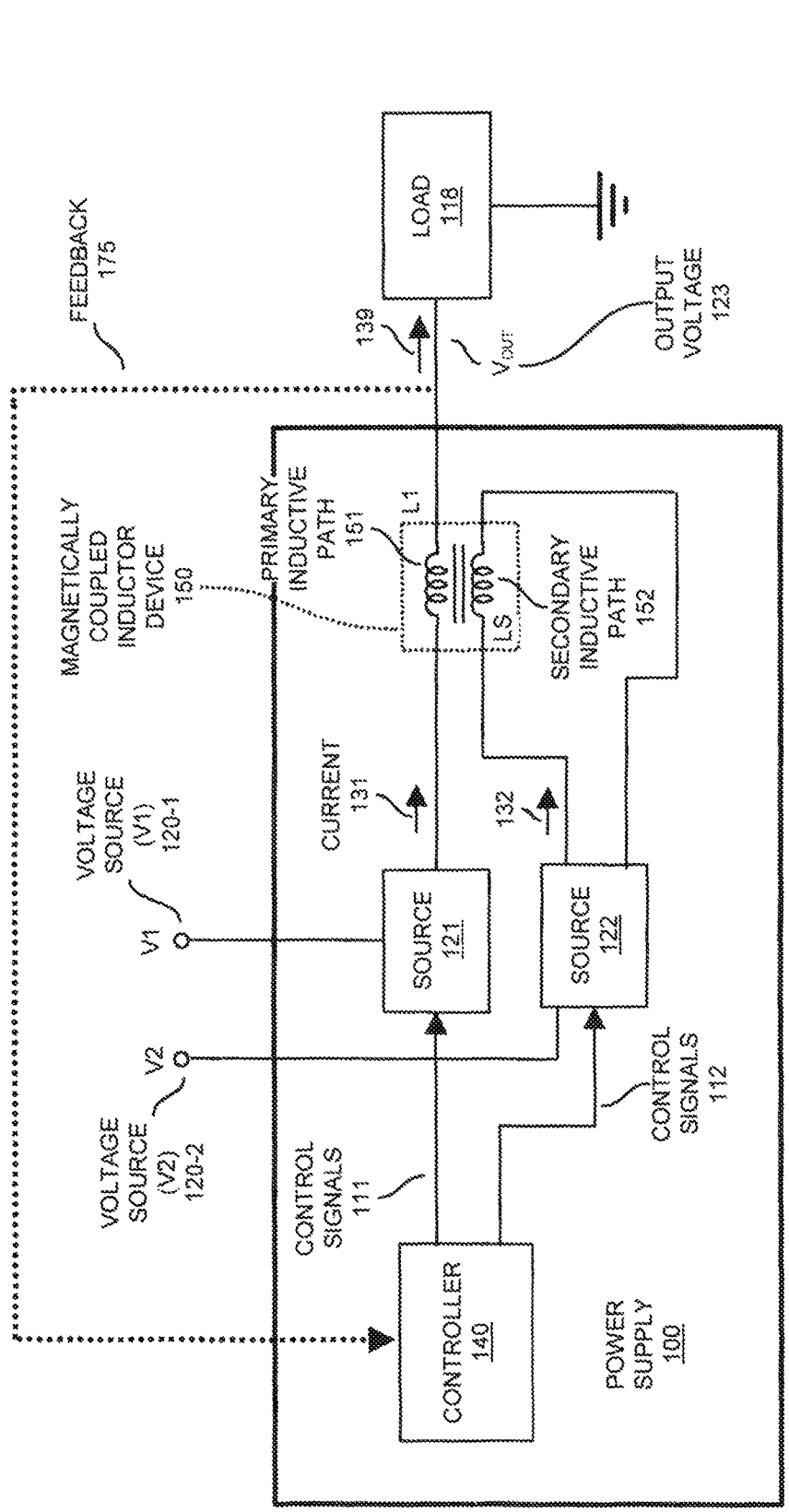
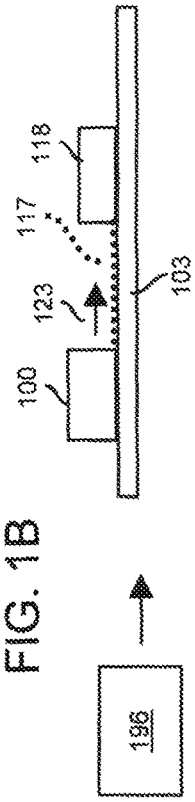
FIG. 1A
FIG. 1B

INDUCTIVE COUPLED POWER SUPPLY AND SLOPE CONTROL

BACKGROUND

Conventional switching power supply circuits sometimes include an energy storage component such as an inductor to produce an output voltage that powers a load. For example, to maintain a magnitude of an output voltage within a desired range, a controller controls switching of input current through the inductor.

A drawback of the inductor-based power supply is the ability to input sufficient current into the inductor during changing load conditions (such as when the load instantaneously consumes more or less power) so that the output voltage stays within regulation.

For example, a load may operate in a steady state condition in which the load consumes a current of 10 Amperes in steady state and then suddenly switches over to consuming a much greater current of 100 Amperes. Conversely, the load may operate in a steady state condition in which the load consumes 100 Amperes in steady state and then suddenly switches over to consuming much less current of 10 Amperes. In either case, it is desirable that the output voltage of a power supply stay within a desired voltage range during these types of transient condition.

BRIEF DESCRIPTION

This disclosure includes the observation that conventional switching power supplies have a limited ability to maintain an output voltage within a desired range during transient load conditions. For example, conventional switching power supplies are limited as to how quickly they are able to switch from outputting 1 Amp (Amperes) to outputting 100 Amps (and vice versa). It is possible to modify parameters such as the input voltage and inductance of a respective switching power supply to accommodate a wide range of transient load conditions. However, such modifications can require a larger sized circuit components and reduce circuit efficiency of a respective power supply.

As a more specific example illustrating limitations of conventional power supplies, in a SMPS (Switched Mode Power Supply) where the input voltage and output voltage are set or within a limited operating range, the ±di/dt (a.k.a., current slope) during load step changes are set and not actively changeable. For a conventional buck converter or any switching power supply application, this disclosure includes the observation that the rate of change of the output current (di/dt) through a corresponding output inductor L of a buck converter is as follows:

$$di/dt = (Vin - Vout)/L;$$

where di/dt is equal to the maximum slope of increasing output current when a respective high-side switch of the buck converter is ON (input node of inductor coupled to Vin), Vin=input voltage of the inductor, and Vout is equal to the output voltage of the inductor;

And in the discharge mode, the maximum negative rate is:

$$-di/dt = Vout/L;$$

where −di/dt is equal to the maximum negative slope of decreasing output current when a respective low-side switch is ON (input node of inductor coupled to ground reference), Vin is the input voltage of the inductor, and Vout is equal to the output voltage of the inductor.

Since Vin, Vout, and L are relatively set values in a respective power supply application, the corresponding rate of change (slope) of the current are also set and unchangeable.

As further discussed below, embodiments herein provide slope adjustments in both the positive and negative direction via an additional galvanic coupled system (such as a slope booster circuit that adjusts current through a primary inductive path), providing better response to transient load consumption conditions.

Embodiments herein provide novel and improved generation of an output voltage via a switched power supply that powers a load.

For example, in one embodiment, a power supply includes a power source, a primary inductive path, and a secondary inductive path. The primary inductive path is coupled to receive input current from the power source. The secondary inductive path is magnetically coupled to the primary inductive path and adjusts current flow through the primary inductive path. The primary inductive path produces an output voltage to power a load.

In yet further embodiments, the power system includes a primary inductive path, secondary inductive path, and a controller. The primary inductive path receives first current from a power source. The secondary inductive path is magnetically coupled to the primary inductive path, the secondary inductive path driven with second current. The controller adjusts/controls an impedance of the primary inductive path via control of a magnitude of the second current through the secondary inductive path.

Further embodiments herein include a controller that monitors a magnitude of the output voltage and/or current supplied to the load. Based on one or more such parameters (such as magnitude of output voltage, current consumption, etc.), the controller controls delivery of the input current to the primary inductive path.

In yet further embodiments, when the controller determines that control of inputted current through the primary inductive path alone is insufficient to maintain the output voltage within a desired voltage range, the controller controls a flow of current through the secondary inductive path that is magnetically coupled to the primary inductive path. Via controlling the input of the current through the primary inductive path and supplemental control of regulating an amount and direction of current through the secondary inductive path, the controller maintains regulation of the output voltage within a desired range during transient conditions.

In one embodiment, as previously discussed, control of current through the secondary inductive path changes an impedance associated with the primary inductive path.

Note that the supplemental control of current though the secondary inductive path as described herein enables the controller to adjust current flow (via so-called current boost, such as positive or negative) through the primary inductive path. Via the supplemental control, the controller provides enhanced slope control of changing the output current delivered from the primary inductive path.

In accordance with further embodiments, the primary inductive path is a winding of a multi-winding transformer. For example, the transformer can be configured to include a first winding and a second winding. The first winding (i.e., primary inductive path) receives current (or, more generally, energy) inputted from a first power source. In one embodiment, a controller monitors the output voltage and controls input of the energy from the first power source to the first winding (primary inductive path).

As previously discussed, on an as-needed basis, the primary inductive path further receives an adjustment to respective current depending on current through the second inductive path.

In accordance with further embodiments, note that a coupling coefficient between the first winding and the second winding of the transformer as described herein is any suitable value. By way of non-limiting example embodiment. the coupling coefficient between the first winding and the second winding is between 0.6 and 0.95. The primary inductive path includes a series leakage inductance (Lk).

Further embodiments herein include a controller operable to switch between a first operational mode and a second operational mode. In the first mode, the controller supplies current in a first direction through the secondary inductive path. In a second mode, the controller supplies current in a second direction through the secondary inductive path. As previously discussed, in one embodiment, flow of current through the secondary inductive path changes an impedance associated with the primary inductive path.

Further embodiments herein include a controller operable to switch between: i) operation of the power supply in a first mode in which the primary inductive path produces the output voltage while no current flows through the secondary inductive path, and ii) operation of the power supply in a second mode in which the primary inductive path produces the output voltage while current flows through the secondary inductive path.

In accordance with yet further embodiments, the power supply as described herein includes first switches and second switches. Via first control input from a controller, the first switches control delivery of the input current from a first power source (voltage source) through the primary inductive path (such as a first winding of a transformer). Via second control input from the controller, the second switches control a magnitude of current through the second inductive path. In one embodiment, as previously discussed, the controller also controls a direction of the current through the secondary inductive path, which adjusts an amount of current provided by the primary inductive path to the load.

In yet further embodiments, the power source is a first voltage, the power supply further comprises a voltage regulator, first switches, and second switches. The voltage regulator is operable to produce a second voltage from the first voltage. As previously discussed, via control of the first switches, the controller controls delivery of the input current from the first voltage to the primary inductive path. Via control of the second switches, the controller controls delivery of current through the secondary inductive path, and thus an amount of current through the primary inductive path.

In still further embodiments, as previously discussed, the controller is operable to control a flow of current through the secondary inductive path during a transient condition in which an output current consumed by a load changes from a first level to a second level. The output current is maintained at the second level while the current provided by the source through the primary inductive path gradually shifts from the first level to the second level during which the contribution of the adjustment to the output current is correspondingly gradually reduced.

Embodiments herein are novel and useful over conventional power supplies. For example, in contrast to conventional power supplies, embodiments herein include magnetic coupling of an auxiliary (second) secondary inductive path to a primary inductive path to accommodate transient load conditions in which the load suddenly consumes more or less current.

These and other more specific embodiments are disclosed in more detail below.

Note that any of the resources implemented in system as discussed herein can include one or more computerized devices, controllers, mobile communication devices, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to produce an output voltage. The instructions, when executed by computer processor hardware, cause the computer processor hardware (such as one or more co-located or disparately located processor devices or hardware) to: control first current through a first inductive path; control second current through a second inductive path, the second inductive path magnetically coupled to the first inductive path; and produce an output voltage to power a load based on an output of the first inductive path.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to switching power supplies, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 1A is an example diagram illustrating a power supply in which a primary inductive path receives energy from one or more sources according to embodiments herein.

FIG. 1B is an example diagram illustrating fabrication of a power supply on a circuit board according to embodiments herein.

Figure 2:
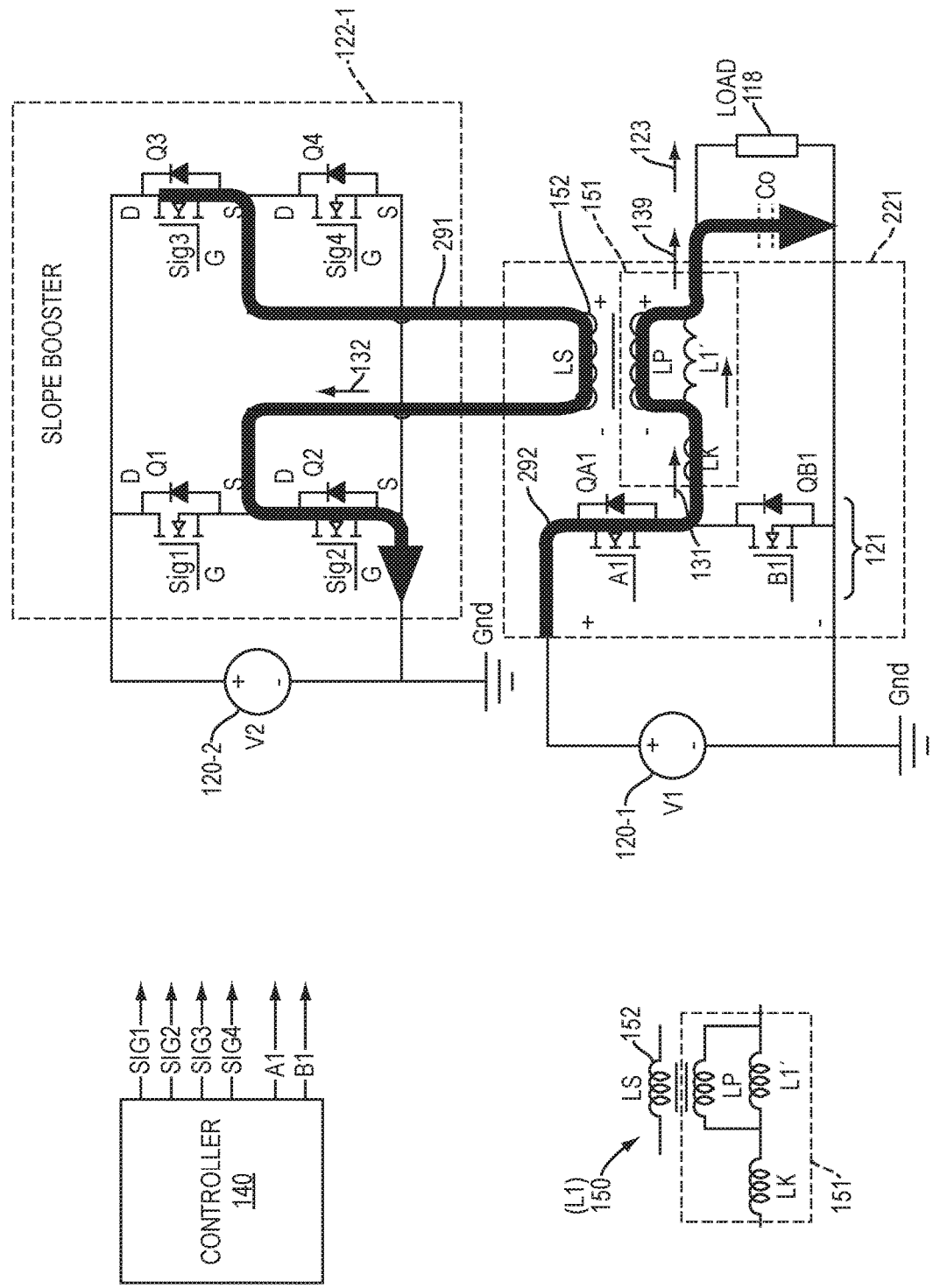
FIG. 2 is an example diagram illustrating current flow (associated with a slope booster) during a ramp up mode according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A power supply includes a power source, a primary inductive path, and a secondary inductive path. The primary inductive path is coupled to receive input current from the power source. The secondary inductive path is magnetically coupled to the primary inductive path to adjust current flow through the primary inductive path, the primary inductive path operative to produce an output voltage.

Now, with reference to the drawings, FIG. 1A is an example diagram illustrating a power supply including a primary inductive path and a secondary inductive path according to embodiments herein.

In this example embodiment, the power supply 100 produces output voltage 123 that powers the dynamic load 118 (such as one or more electronic circuits, components, etc.).

The power supply 100 includes multiple components such as a controller 140, source 121 (such as a current source, voltage source, power source, etc.), source 122 (such as current source, voltage source, power source, etc.), and magnetically coupled inductor device 150. Magnetically coupled inductor device 150 (such as a transformer or other suitable device) includes primary inductive path 151 (such as a first winding) and secondary inductive path 152 (such as a second winding).

If desired, the source 122 can be configured to receive the voltage V1 instead of V2, alleviating the need for multiple voltage sources.

Further in this example embodiment, the power supply 100 includes primary inductive path 151. In one embodiment, primary inductive path 151 is a winding of magnetically coupled inductor device 150.

In accordance with further embodiments, the controller 140 controls a flow of current through primary inductive path 151 and secondary inductive path 152 via generation of one or more control signals 111 and one or more control signals 112.

More specifically, via controls signal(s) 111, the controller 140 controls a flow of current 131 supplied by current source 121 and conveyed through the primary inductive path 151 (winding) of the magnetically coupled inductor device 150.

Via controls signal(s) 112, the controller 140 controls a magnitude and direction of current 132 supplied by current source 122 and conveyed through the secondary inductive path 152 of the magnetically coupled inductor device 150.

In accordance with further embodiments, the controller 140 receives one or more feedback parameters associated with the output voltage 123.

For example, the controller 140 can be configured to receive feedback 125 indicating one or more parameters such as a magnitude of the output voltage 123, amount of current supplied by the output voltage 123 (through primary inductive path 151) to the load 118, etc.

In accordance with still further embodiments, the controller 140 monitors feedback 175 (such as a magnitude of the output voltage 123, current consumed by load 118, etc.) and, based on such one or more monitored parameters, controls delivery of the input current 131 to the primary inductive path 151 and current 132 through the secondary inductive path 152.

More specifically, in one embodiment, when the controller 140 determines that control of inputted current through the primary inductive path 151 alone is insufficient to maintain the output voltage 123 within a desired voltage range, the controller 140 controls a flow of current 132 to be non-zero through the secondary inductive path 152, which is magnetically coupled to the primary inductive path 151.

As further discussed herein, the flow of current through the secondary inductive path 152 provides adjustment to the output current 139 and greater control over the change in current (slope) associated with the primary inductive path 151.

Via controlling the input of the current 131 through the primary inductive path 151 and supplemental control of regulating an amount and direction of current 132 through the secondary inductive path 152 magnetically coupled to the primary inductive path 151, the controller 140 maintains regulation of the output voltage 123 within a desired range during both steady state and transient current consumption conditions by the load 118.

Note further that there are three main variables that can increase di/dt capabilities of slope boosting (such as source 122 and secondary inductive path 152) as described herein.

The first variable to increase di/dt (slope or current change over time) capability associated with the primary inductive path 151 is the magnitude of voltage V2 associated with the slope booster (such as source 122 and secondary inductive path 152). In one embodiment, the magnitude of the voltage V2 of voltage source 120-2 is greater than the voltage V1 provided by voltage source 120-1, assuming that L1 (number of windings of primary inductive path 151) and LS (number of windings associated with secondary inductive path 152) are the same or close to 1:1.

The second variable to increase di/dt (slope or current change over time) capability associated with the primary inductive path 151 is the number of turns of LS (associated with secondary inductive path 152), which is lower than the number of turns of L1 (primary inductive path 151) in order to apply a higher voltage upon L1 from LS. Based on such settings, the current boost concept as described herein also works even if the input/output voltages are very low, eliminating the slope limitations from low input/output voltages of the switch mode power supply. One can also consider an additional method which is a mixture of both variables, having higher voltage V2 as well as a turn ratio of LS and L1 that is not 1:1.

The third variable to increase di/dt (slope or current change over time) capability associated with the primary inductive path 151 is to design the leakage inductance of the coupled inductor (secondary inductive path 152) since this is seen by the load 118 as the output inductance of the buck when the slope booster is operating, which in turn controls the di/dt of the primary inductive path 151 during load current consumption changes. The leakage inductance is then the direct result of the coupling between LS (secondary inductive path 152) and L1 (primary inductive path 151).

Note that a further benefit of the slope booster resource (such as current source 122 and/or secondary inductive path 152) is that it only operates (under control of the controller 140) during current load step events and therefore does not contribute towards overall steady state of the power supply 100 (such as a switched mode power supply).

Thus, embodiments herein include a slope booster circuit and respective control method. Such embodiments can be implemented in any switched mode power supply to control the di/dt (i.e., change in supplied current rover time) of the primary inductive path 151 input/output current, especially during step load changes (change in current consumption by the load 118). Theoretically, embodiments herein can be applied to any power supply with magnetic components, i.e. inductors.

FIG. 1B is an example diagram illustrating fabrication of a power supply on a circuit board according to embodiments herein.

In this example embodiment, fabricator 196: receives a circuit board 103; affixes the power supply 100 (and corresponding components) to the circuit board 103. The fabricator 196 further affixes the load 118 to the circuit board 103. The fabricator 196 couples the power supply 100 to the load 118, e.g., via optional circuit path 117 (such as one or more traces, etc.). In one embodiment, the circuit path conveys output voltage 123 generated from the power supply 100 to the load 118.

In accordance with further embodiments, one configuration includes processor load on top of (or coupled to) a processor substrate, which itself is connected to a respective circuit board. If desired, the processor load can be connected to a circuit board via an optional socket on the circuit board. Additionally, or alternatively, embodiments herein can include an interposer between a processor load substrate and a respective socket or the circuit board.

In accordance with further possible embodiments, power conversion can occur directly from within the processor load (CPU load) substrate. Thus, as previously discussed, the circuit path 117 is optional.

Accordingly, embodiments herein include a system comprising: a circuit board 103 (substrate such as a standalone board, mother board, standalone board destined to be coupled to a mother board, etc.); a power supply 100 including one or more inductor devices as described herein; and a load 118, the load 118 powered by the output voltage 123. The load 118 can be any suitable circuit such as CPUs (Central Processing Units), GPUs (Graphics Processing Unit) and ASICs (Application Specific Integrated Circuits such those including one or more Artificial Intelligence Accelerators), which can be located on standalone circuit board.

FIG. 2 is an example diagram illustrating details of a power supply according to embodiments herein.

In this example embodiment, as shown, the switching power supply 221 includes switch QA1, switch QB1, and primary inductive path 151. The voltage source 120-1 supplies voltage V1 (such as 6 VDC or any suitable voltage) to the series combination of switch QA1 (such as a high-side switch) and switch QB1 (such as a low-side switch).

Further in this example embodiment, the primary inductive path 151 (a.k.a., L1) is shown an equivalent circuit including inductor Lp (100% coupled to the inductive path 152), inductor L1', and leak inductor Lk. As shown, inductor L1' is disposed in parallel with inductor Lp; inductor Lk is in series with inductor L1'.

In one embodiment, the combination of switch QA1 and QB1 as well as primary inductive path 151 operate similar to a buck converter topology.

Yet further in this example embodiment, the drain node of switch QA1 is connected to receive voltage V1 provided by voltage source 120-1. The source node of switch QA1 is coupled to the drain node of switch QB1 as well as the input node of primary inductive path 151. The source node of switch QB1 is coupled to ground. The output node of the primary inductive path 151 is coupled to the load 118.

During operation, controller 140 produces control signals 111 (such as control signal A1 and control signal B1) to control states of switches QA1 and QB1. For example, the control signal A1 produced by the controller 140 drives and controls the gate node of switch QA1; the control signal B1 produced by the controller 140 drives and controls the gate node of switch QB1.

Further in this example embodiment, the slope booster 122-1 (circuit) includes switches Q1, Q2, Q3, and Q4.

The voltage source 120-2 supplies voltage V2 (such as 12 VDC or any suitable voltage) to the full bridge arrangement of switches Q1, Q2, Q3, and Q4. The first series combination of switch Q1 and switch Q2 is disposed in parallel with the second series combination of switch Q3 and switch Q4.

The drain node of switch Q1 is connected to receive voltage V2 provided by voltage source 120-2. The source node of switch Q1 is coupled to the drain node of switch Q2 as well as the input node of secondary inductive path 152 (Ls). The source node of switch Q2 is coupled to ground.

As further shown, the drain node of switch Q3 is connected to receive voltage V2 provided by voltage source 120-2. The source node of switch Q3 is coupled to the drain node of switch Q4 as well as the output node of secondary inductive path 152 (Ls). The source node of switch Q4 is coupled to ground.

During operation, controller 140 produces control signals 112 (such as control signal SIG1, control signal SIG2, control signal SIG3, and control signal SIG4). The control signal SIG1 controls the gate (G) of switch Q1; the control signal SIG2 controls the gate (G) of switch Q2; the control signal SIG3 controls the gate (G) of switch Q3; the control signal SIG4 controls the gate (G) of switch Q4. Logic high voltage applied to a gate turns a respective switch ON. Logic low voltage applied to a gate turns a respective switch OFF.

In one embodiment, circuit 221 is instantiated as a voltage converter (such as a buck converter), although embodiments herein can be applied in any suitable application.

Further in this example embodiment, as previously discussed, the circuit 122-1 (slope booster such as an instantiation of power source 122) is a full bridge arrangement (such as bridge configuration of switches Q1, Q2, Q3, and Q4) for both positive and negative di/dt (ramp up and down) as well as modulation with respect to current through primary inductive path 151 as further discussed herein.

Ramp Up Mode

To demonstrate the positive slope boost (ramp up) capability of the slope booster 122-1, the following operating conditions will be used:

V1=6 VDC
Output voltage 123=0.75V
V2=12 VDC
Iload_start=12.5 A
Iload_end=112.5 A
L1=40 nH
LS=40 nH
Coupled inductor ratio=1:1
fswbuck=2 MHz
Coupling coefficient (k) between L1 and LS=0.7

Figure 3:
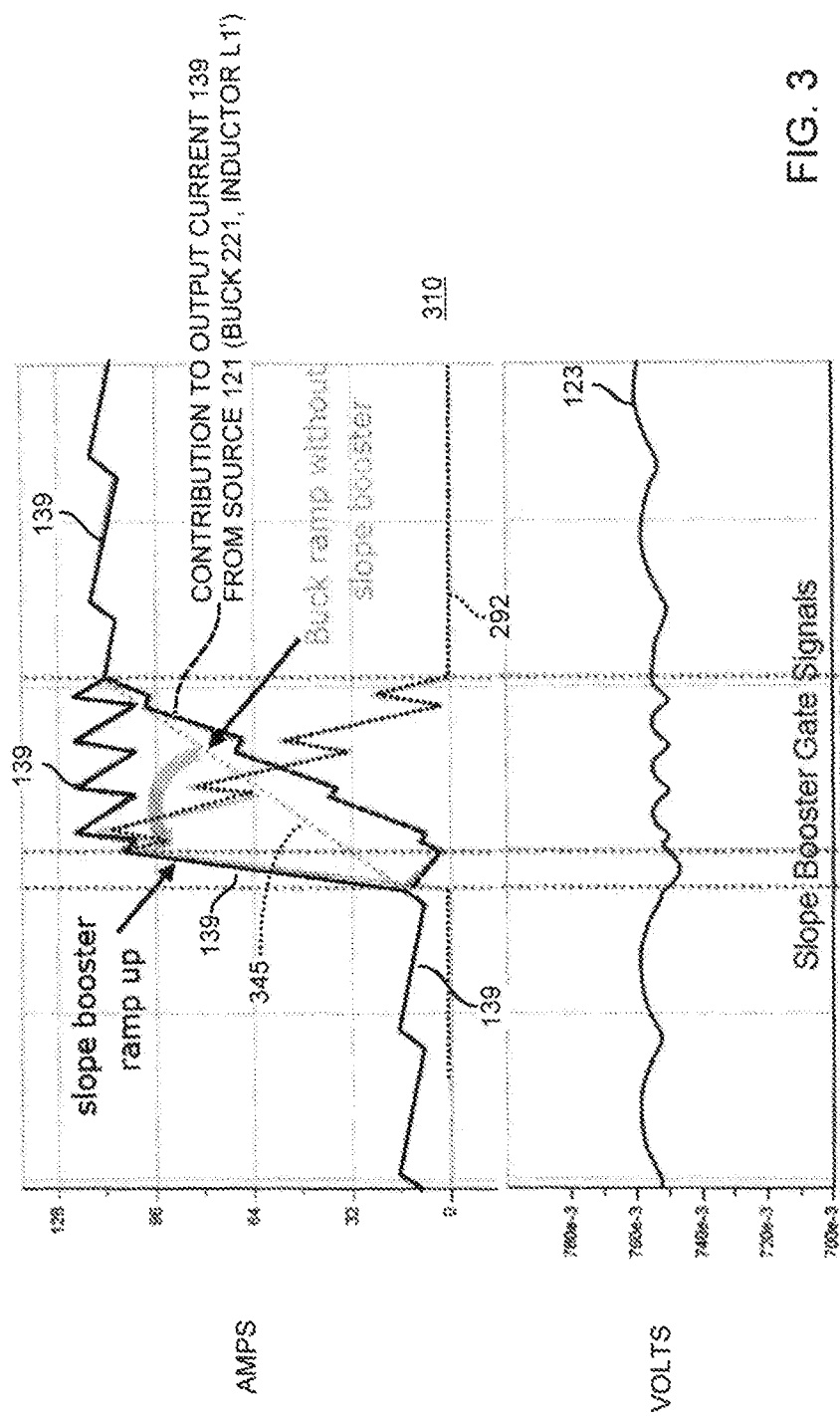
FIG. 3 is an example timing diagram illustrating operation of a power supply during the ramp up mode according to embodiments herein.

FIG. 3 is an example graph diagram (simulated waveforms) illustrating operation of the power supply during a ramp up mode (associated with FIG. 2) according to embodiments herein.

In this example embodiment, the graph 310 of FIG. 3 shows waveforms of signals during ramp up mode. The top portion of graph 310 shows the various current through the coupled inductor and contributions, the middle portion of graph 310 shows the output voltage waveform (output voltage 123), and the bottom portion of graph 310 shows the all the gate signals for the buck and the slope booster 122-1.

In one example embodiment, the slope booster 122-1 only operates during load change transitions when it is needed to maintain regulation of the output voltage 123. During steady state operation, such as when the conveyance of current from source 121 through the primary inductive path 151 supplies sufficient current to the load 118 to maintain the output voltage 123 within regulation, only the buck converter (such as switches QA1, QB1, and primary inductive path 151) is operational. This is shown in the periods before time T0 and after time T2 in graph 310.

Between T1 and T1 in graph 310, the power supply 100 operates in a so-called ramp up or boost mode. This corresponds to a condition in which the current through the inductive path 151 itself cannot meet demands of the load 118 and the magnitude of the output voltage 123 is in danger of dropping below a desired minimum threshold value. In such an instance, to maintain regulation of the output voltage 123, the controller 140 generates signal A1 to remain ON (turning ON switch QA1) between time T0 and time T1; the controller 140 activates switches Q2 and Q3 via setting control signals SIG2 and SIG3 to high states between T0 and T1, imposing a large negative voltage in relation to primary inductive path 151 (a.k.a., inductor L1).

Coupling the slope booster 122-1 and corresponding inductive path 152 magnetically to inductive path L1 (primary inductive path 151) leads in the electric equivalent circuit to two items: an ideal transformer shown as Ls/Lp (with 100% coupling) and a leakage inductance Lk, which represents the amount of overall coupling. In one embodiment, the inductor Lk is an extra component disposed in series with the primary inductive path 151 as opposed to being part of the device 150. In (near) perfect coupling, inductor Lk is a very small inductance value, such as approaching zero as the ultimate limit, whereas in realistic cases inductor Lk is in the range of a few (single digit) nH (nanoHenries).

Activating the slope booster 122-1 by simultaneously turning on switch Q2 and switch Q3 continuously between time T0 and T1 and intermittently between times T1 and T2 creates a positive voltage across the secondary inductive path 152 (a.k.a., inductor Ls) and (because of ideal transformer Ls-Lp) creates a positive current out of Lp flowing directly into the load 118 (such as a result of current loop 291 of FIG. 2). The electric path (loop 292 of FIG. 2) is closed based on the two slope booster switches (namely, activation of switches Q2 and Q3), leakage inductance Lk, the control switch Q1 (high side) of the buck converter 221, and voltage source 120-1.

One aspect of embodiments herein is that di/dt is only governed by the leakage inductance Lk and no longer by the main inductance L1'. Hence, by improving the coupling and making it near perfect, embodiments herein can achieve a basically unlimited dynamic response of providing boost current to the load 118 (via current through the secondary inductive path 152) when needed.

Thus, via activation of switches Q2 and Q3, and via control of corresponding current through the inductive path 152 (inductor Ls), embodiments herein include dynamically changing the impedance of the system (specifically, changing the effective impedance associated with the inductive path 151) dynamically in two different operation modes.

Note that the positive current flowing out of in Lp in this example mode of activating the slope booster 122-1 and secondary inductive path 152 creates a circulating current back through inductor L1'. This is why the current in the main inductance L1' decreases when we operate the slope booster 122-1 in a manner as previously discussed. Physically, the output current 139 supplied to the load 118 must decrease because of the parallel combination of the two inductors Lp and L1' supplying current to the load 118. Adjustment 332 represents an amount of extra current provided by the primary inductive path 152 as a result of current through flowing through the secondary inductive path 152. The electric equivalent circuit associated with inductive path 151 is at least giving an explanation to it.

Thus, during the boost mode, two things occur in parallel during the time between T0 and T1: for example, current 132 is ramped up in LS (secondary inductive path 152) and this current is coupled to inductor Lp (of the primary inductive path 151).

Additionally, since the voltage imposed on L1 (primary inductive path 151) from LS (secondary inductive path 152) is negative and larger than voltage V1, an overall negative voltage is seen by L1' (primary inductive path 151). The output current 139 of the power supply 100 is the sum of these two current components such as current 131 from voltage source 121 and additional current component/contribution such as current though inductor Lp resulting from current 132 flowing through the secondary inductive path 152.

The di/dt of the slope booster basically depends on voltage source V2 and the effective leakage inductance (Lk, shown in following FIG. 4) as seen by the coupled LS current. Therefore, in one embodiment, it is desirable that the coupling coefficient between L1 (primary inductive path 151) and LS (secondary inductive path 152) be a value that is not so close to 1. In this example case, 0.7 was used a respective coupling coefficient in order to give a realistic controllable current ramp.

Between T1 and T2, after boosting the output current to the load 118, the controller 140 operates in a so-called regulation mode again. During such time, the ramped up current reaches the new required current level and the slope booster 122-1 modulates the full bridge via PWM to maintain the output current 139 at this new current level. In one embodiment, the regulation frequency used during this period is at 6 MHz, although this can be any suitable frequency.

At time T2, the current component of L1 becomes the same as the output current 139 (iout) and the buck converter operation (switches QA1, QA2, and primary inductive path 151) provides the operation of producing the output voltage 123, without any further current adjustments to output current 139 caused by current through the secondary inductive path 152.

The dotted line 345 indicates the maximum possible di/dt from the buck converter components without implementing the slope booster 122-1 capability as previously described. Thus, adjustment of current through the primary inductive path 151 (due to current through the secondary inductive path 152) provides a faster transition to providing the load 118 with the appropriate current. In other words, without the slope booster 122-1 capability as described herein, the standard buck components associated with power converter circuit 221 would only be able to provide appropriate current to the load 118 after (T2 minus T0) units of time; whereas implementation of the slope booster 122-1 and current through the secondary inductive path 152 decreases the response time of providing appropriate current to the load 118 to (T1 minus T0) units of time, which is a short amount of time compared to the duration between T0 and T2.

Figure 4:
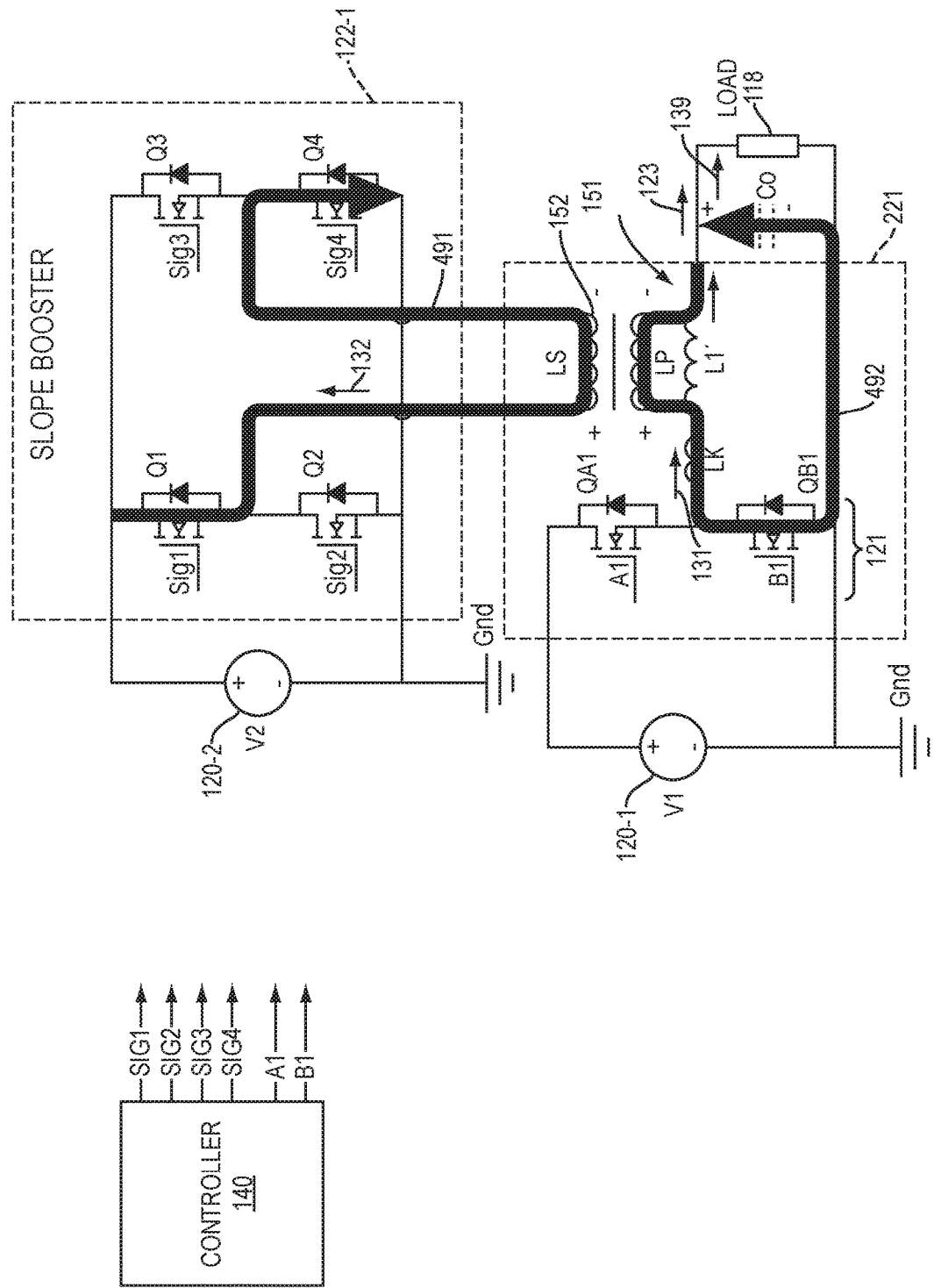
FIG. 4 is an example diagram illustrating current flow (associated with a slope booster) during a ramp down mode according to embodiments herein.

FIG. 4 is an example diagram illustrating current flow (associated with a slope booster) during a ramp down mode according to embodiments herein.

Ramp Down Mode

To demonstrate the negative slope boost (ramp down), the following operating conditions will be used:
V1=6 VDC
Vload=0.75 VDC
V2=12 VDC
Iload_start=112.5 A
Iload_end=12.5 A
L1=40 nH
LS=40 nH
Coupled inductor ratio=1:1
fswbuck=2 MHz
Coupling coefficient (k) between L1 and LS=0.7

As previously discussed, in one embodiment, the slope booster 122-1 functionality is only implemented during load change transitions; during steady state operation, only the power converter circuit 221 is operational to produce the output voltage 123. This is shown in the periods before time T10 and after time T12.

As shown, activation of switches Q1 and Q4 and flow of current through the second inductive path 152 (in FIG. 4) results in current loop 491 providing boost current capability. Effects of current loop 491 and resulting loop 492 is further discussed below in FIG. 5.

Figure 5:
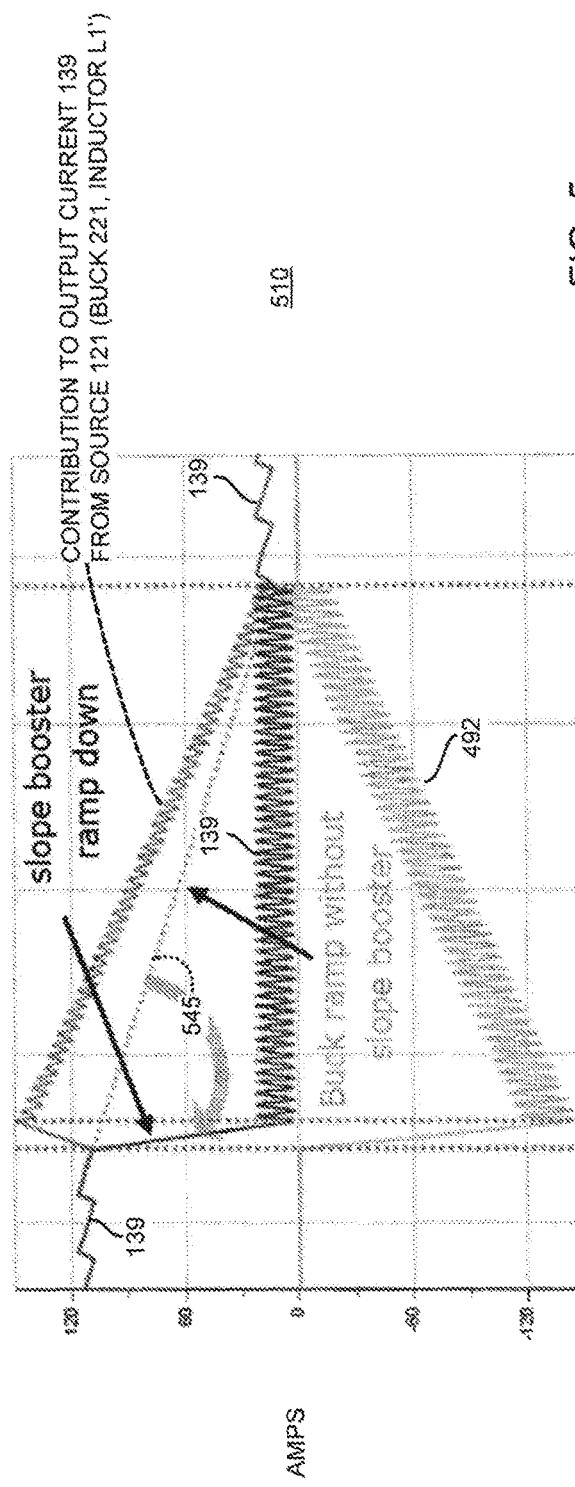
FIG. 5 is an example timing diagram illustrating operation of a power supply during the ramp down mode according to embodiments herein.
Figure 5:
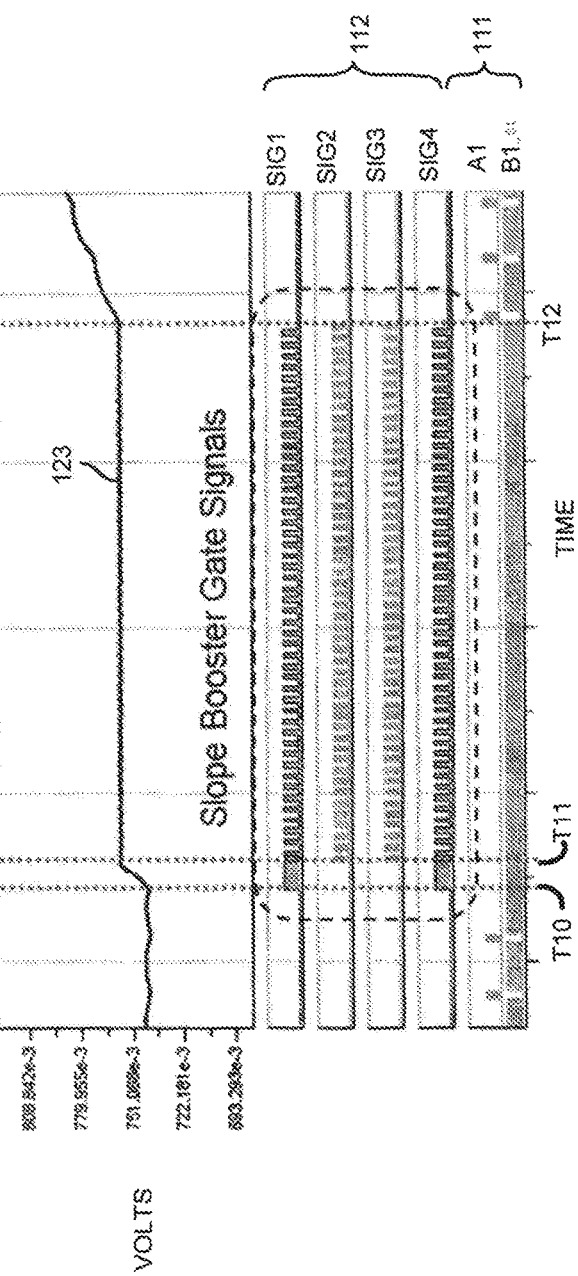

FIG. 5 is an example timing diagram illustrating operation of the power supply during a ramp down mode according to embodiments herein.

In this example embodiment, between time T10 and time T11, the slope booster 122-1 operates in a boost ramp-down mode. Operation between T10 and T11 in graph 510 results in a condition in which a magnitude of the current through the inductive path 151 is more current than is consumed by the load 118. In such an instance, the magnitude of the output voltage 123 is in danger of overshooting a maximum output voltage regulation threshold value because of the transient decrease in current consumed by the load 118. To maintain regulation of the output voltage 123, the controller 140 generates signal B1 to remain ON (turning ON switch QB1) between time T10 and time T11 while switch QA1 is OFF; the controller 140 deactivates switches Q2 and Q3 via setting control signals SIG2 and SIG3 and activates switches Q1 and Q4 via setting control signals SIG1 and SIG4 to high states between T10 and T11, imposing a large positive voltage in relation to primary inductive path 151 (a.k.a., inductor L1).

As previously discussed, coupling of the slope booster 122-1 and corresponding inductive path 152 magnetically to inductive path L1 (primary inductive path 151) leads to the electric equivalent circuit to two items: an ideal transformer shown as Ls/Lp (with 100% coupling) and a leakage inductance Lk, which represents the amount of overall coupling. In (near) perfect coupling, inductor Lk is a very small inductance value, such as approaching zero as the ultimate limit, whereas in realistic cases inductor Lk is in the range of a few (single digit) nH (nanoHenries).

Activating the slope booster 122-1 by simultaneously turning on switch Q1 and switch Q4 continuously between time T10 and T11 (causing flow current 132) and intermittently between times T11 and T12 creates a negative voltage across the secondary inductive path 152 (a.k.a., inductor Ls) and (because of ideal transformer Ls-Lp) creates a negative current associated with inductor Lp via current loop 491 of FIG. 4). This electric path (loop 491 of FIG. 4) is closed through the two slope booster switches (namely, switches Q1 and Q4), the control switch Q2 (low side) of the converter 221 and the leakage inductance Lk.

One aspect of this current loop 491 is, that di/dt is only governed by the leakage inductance Lk and no longer by the main inductance L1'. In other words, when no current flows through the secondary inductive path 152, the effective inductance of the power converter circuit 221 is inductor Lk plus inductor L1'. When sufficient current 132 flows through the secondary inductive path 152 in the appropriate direction shown, the effective inductance of the power converter circuit 221 is just inductor Lk because current through inductor Lp (induced by current through the secondary inductive path 152, LS) negates inductance associated with inductor L1' associated with the primary inductive path 151. Hence, by improving the coupling and making it near perfect, embodiments herein can achieve a basically unlimited dynamic response of providing boost current to the load 118 (via current through the secondary inductive path 152) when needed.

Thus, via activation of switches Q1 and Q4, and via control of corresponding current through the inductive path 152 (inductor Ls), embodiments herein include changing the impedance of the system (specifically, impedance associated with the inductive path 151) dynamically in two different operation modes.

Note that the negative current associated with inductor Lp in this example mode of activating the slope booster 122-1 and secondary inductive path 152 creates a circulating current back through inductor L1'. This is why the current in the main inductance L1' to the load 118 increase as shown in FIGS. 4 and 5. Physically, the total output current 139 supplied to the load 118 must decrease because of the parallel combination of the two inductors Lp and L1'. Adjustment associated with loop 492 in timing diagram 510 represents a reduction in current provided by the primary inductive path 151 to the load 118 as a result of current through flowing through the secondary inductive path 152. The electric equivalent circuit associated with inductive path 151 is at least giving an explanation to it.

Thus, two things occur in parallel during this period between T10 and T11: First, current 132 in the secondary inductive path 152 (Ls) is ramped down (opposite direction to the ramp up mode as previously discussed) and this current is coupled to inductor L1. Second, since the voltage imposed on L1 (primary inductive path 151) from LS (secondary inductive path 152) is positive and is higher than the negative discharge voltage of L1, an overall positive voltage is seen by L1 and the current through L1 (primary inductive path 151) decreases. The output current of the buck is now the sum of these two opposing current components and which is shown as output current 139 (iout). Thus, embodiments herein include applying a higher negative current in the opposite direction to cancel the original buck current to produce an effective output current 139 that is ramping down at a much higher di/dt than what is naturally possible via switching switch QB1 ON alone. The dotted line 545 indicates the maximum possible −di/dt from the buck converter without the slope booster 122. In one embodiment, the controller 140 prevents over-energizing the magnetic core to saturation due to the increased current in L1. Therefore, a maximum −di/dt would exist depending on the core design, but this is only limited to the design and not a theoretical limit.

Note further that, between T11 and T12, the controller 140 operates in a regulation mode in which the adjustments to current associated with the primary inductive path 151 (via current through the secondary inductive path) is ramped down to zero, while the primary inductive path 151 eventually catches up to reducing the output current 139 to the appropriate level without activation of the booster 122-1.

In one embodiment, the regulation frequency used to control switches Q1 and Q4 during this period is again around 6 MHz, although switching can be implemented at any suitable frequency.

Figure 6:
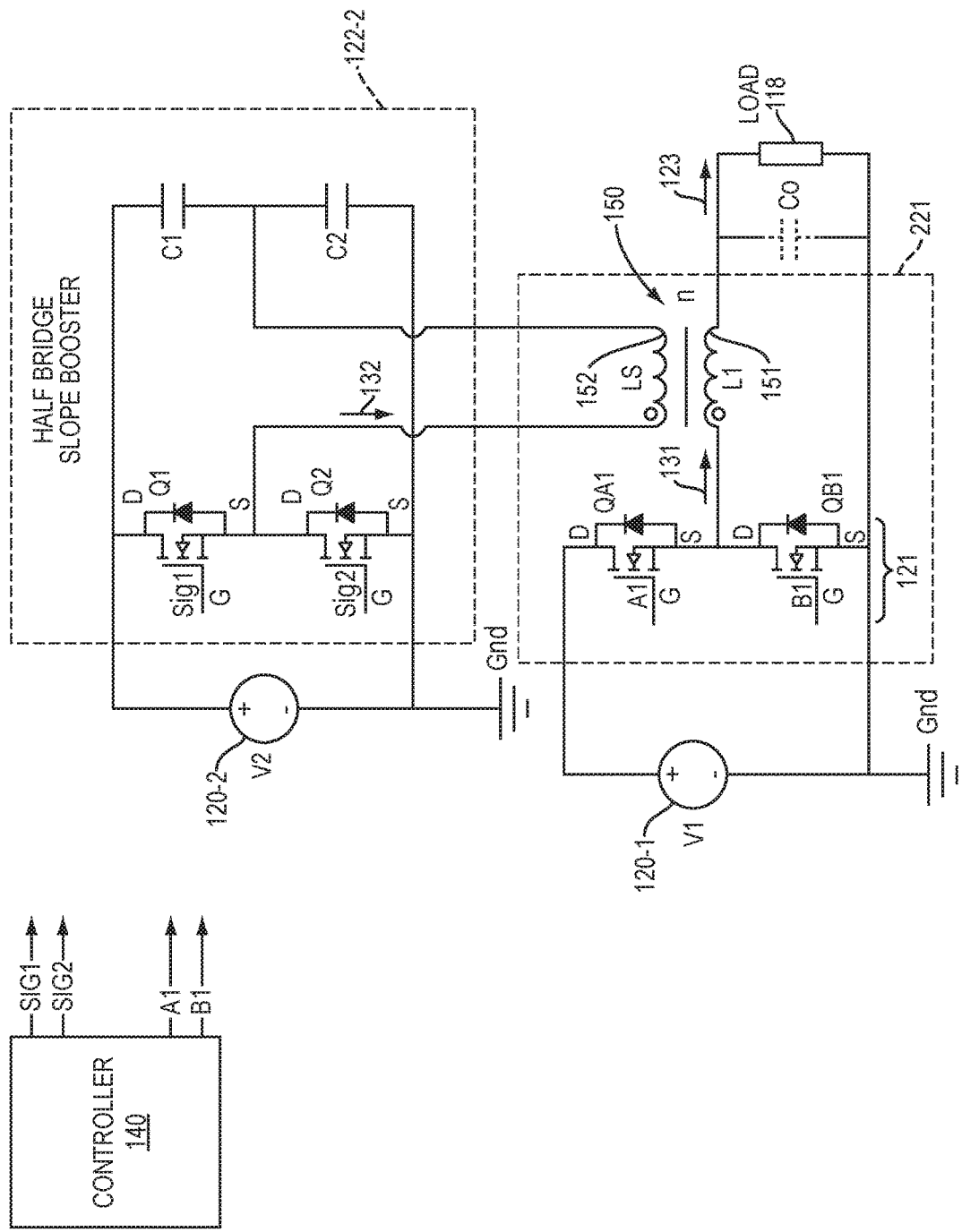
FIG. 6 is an example diagram illustrating a half bridge circuit providing control of current through a second winding magnetically couple to the primary inductive path according to embodiments herein.

FIG. 6 is an example diagram illustrating a half bridge circuit providing control of a second inductive path magnetically coupled to the primary inductive path according to embodiments herein.

Half Bridge Slope Booster

In accordance with further embodiments, it should be noted that the slope booster (122-1) and corresponding circuitry (such as switch Q3 replaced with capacitor C1, switch Q4 replaced with capacitor C2) can be implemented in any suitable manner.

Figure 8:
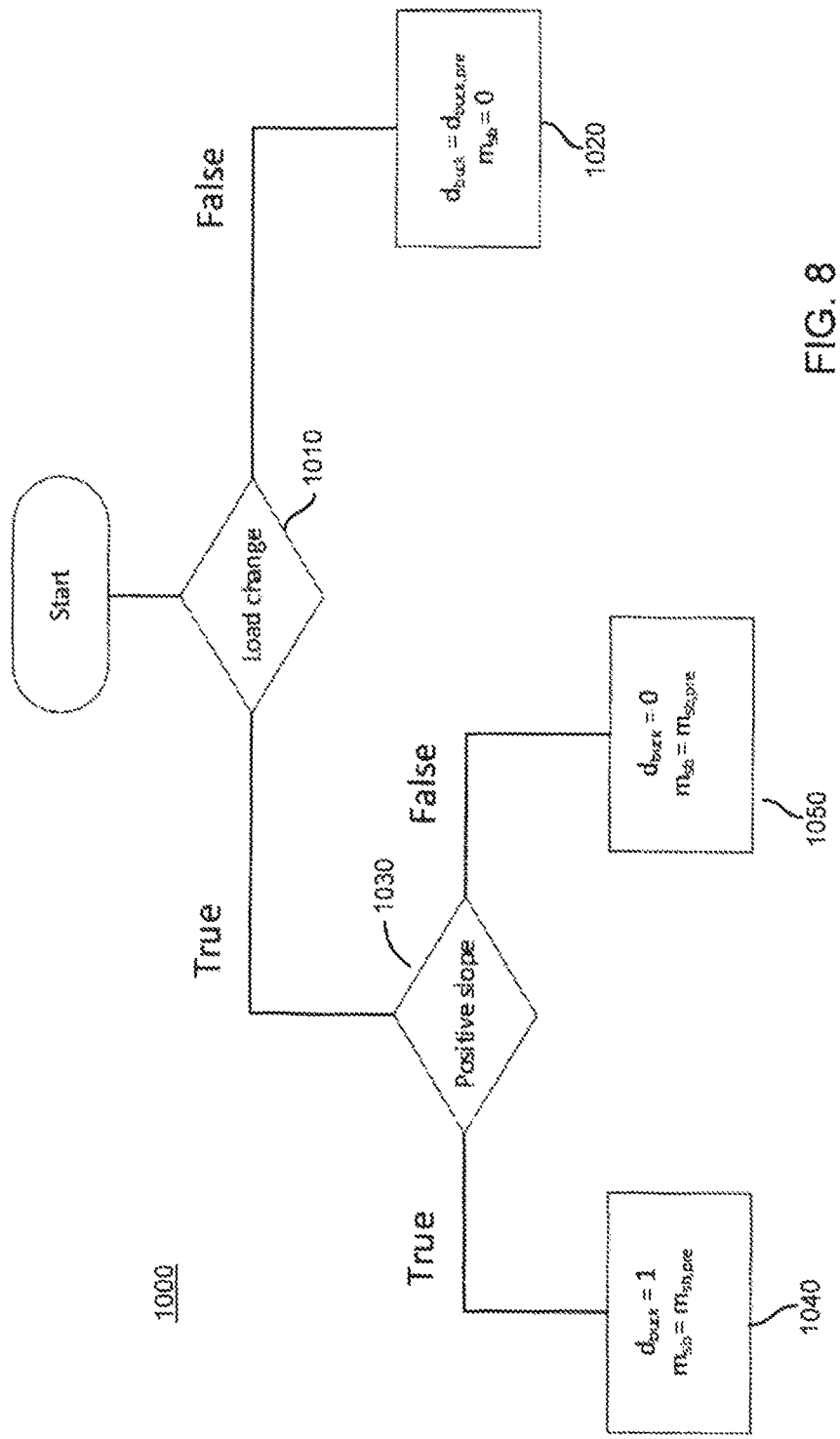
FIG. 8 is an example diagram illustrating a flowchart of implementing the slope booster current control according to embodiments herein.

In one embodiment, the slope booster (122-1) is implemented via a half bridge inverter leg type circuit as shown in FIG. 8. This booster provides the same functionality of the full bridge slope booster (circuit 122-1), while using fewer number of active switches.

In one embodiment, in order to achieve the same di/dt as the full bridge, the voltage source V2 has to be twice as high.

In one embodiment, the capacitance of C1 and C2 has to be sufficiently large in magnitude in order for the voltage not to collapse in some operations.

In one embodiment, voltage balancing is implemented between C1 and C2 in order to prevent instability.

Figure 7:
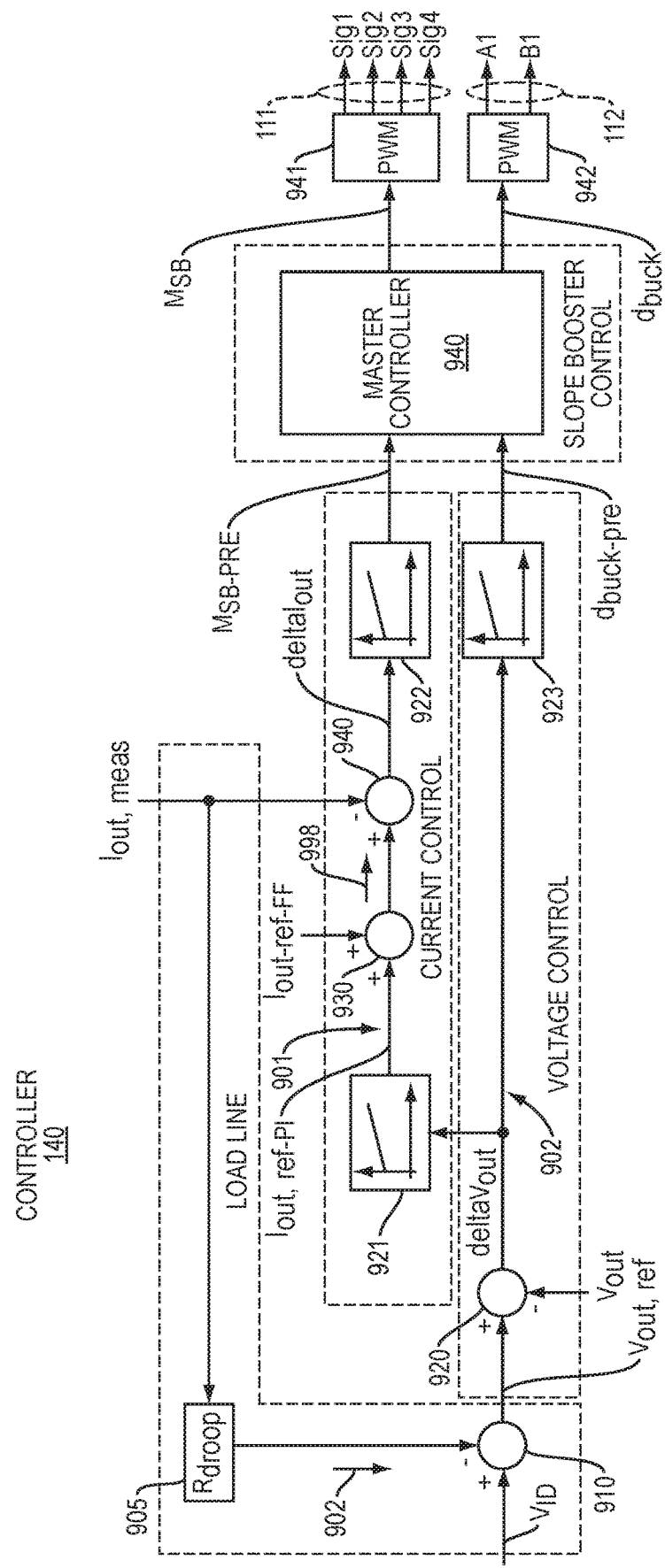
FIG. 7 is an example diagram illustrating slope booster current control according to embodiments herein.

FIG. 7 is an example diagram illustrating slope booster control according to embodiments herein.

The slope booster 122-1 has only been shown to operate with a buck converter, but it is nevertheless possible to operate the slope booster 122-1 with any other switching power supply topologies. Therefore, slope booster 122-1 can be controlled in any suitable manner.

In one embodiment, an intended target application is a VRM (Voltage Regulation Module). Even within the slope booster 122-1 plus buck circuitry, there can be numerous methods of control. For example, one can specifically implement control of the output current 139 slope to whatever the application requires. In one embodiment, only a simple Iref (current reference) in time is required for the controller 140 to track and follow.

Note that FIG. 7 illustrates another example of controller 140 associated with the power supply 100 (and slope booster 122-1) in which the controller 140 controls most/all transient step changes at the maximum di/dt that it is capable of providing.

More specifically, in this example embodiment, controller 140 implements two feedback control loops to maintain the output voltage 123 in regulation during steady state and transient conditions. For example, in this embodiment, control is split into two parallel control loops, one fast loop 901, which is the current control by the master controller 940. The control loop 901 controls the slope booster (via generation of signals SIG1, SIG2, SIG3, and SIG4 driving switches Q1, Q2, Q3, and Q4. The slow control loop 902 associated with controller 140 provides voltage control for the buck converter components (switches QA1, QB1, and primary inductive path 151).

In this example embodiment, the measured Iout (output current 139 from the primary inductive path 151 driving load 118) is used as a reference with respect to the load line output voltage 902 (i.e., magnitude of output current 139 times Rdroop). As further shown, difference resource 910 compares the voltage ID (reference voltage) set by a resource such as a CPU (Central Processing Unit) and the load line voltage 902.

The output of difference resource 910 is Vout, ref (Voutref). Difference resource 920 compares the actual measured output voltage 123 to the Vout, ref signal. The difference value outputted from the comparison (difference resource 920) is delta Vout. The control function 923 and master controller 940 uses the generated delta Vout value received from the difference resource 920 as a basis to control the settings of control signals 112 (during slow buck regulation).

In this control loop 902, the controller 940 does not react quickly to step changes but does react to the slow drift of Vout (output voltage 123) to compensate for any of the voltage drop before the actual load. In this case, the change in duty cycle associated with control signals 112 (control signal A1 and B1) is minimal, as it provides adjustment for small Vout variations. One can consider this to be near constant duty cycle to maintain the steady state current, whatever it may be. During steady state conditions, the master controller 940 simply sends these signals (such as dbuck, pre signals) to the PWM controller 942, while control signals 111 are set to deactivate all respective switches Q1-Q4).

However, when a load step occurs with respect to consumption of output current 139 by the load 118, the controller 940 implements the fast loop 901 to provide a quick response to the transient condition.

More specifically, in one embodiment, the summer 930 in the fast response loop 901 receives the feed forward Iout reference signal (namely, Iout-ref-FF) and reference signal Iout-ref-PI (of a PI controller) outputted from PI control function 921. The control function 921 in the current monitoring control loop 901 (fast loop) receives the delta Vout signal outputted from resource 920 and calculates an Iout reference PI signal (Iout-ref-PI) for the PI control function associated with the fast loop 901; the summer 930 adds the feed forward Iout reference PI signal and the feed forward signal (Iout-reference-FF) to produce signal 998.

Difference function 940 compares the signal 998 from summer 930 to the output current 139 measurement (Iout, meas). Output current 139 represents a present amount of current consumed by the load 118. Based on the difference, the difference function 940 produces delta Iout signal (signal 998 minu Iout,meas); this difference is inputted to function 922.

Figure 10:
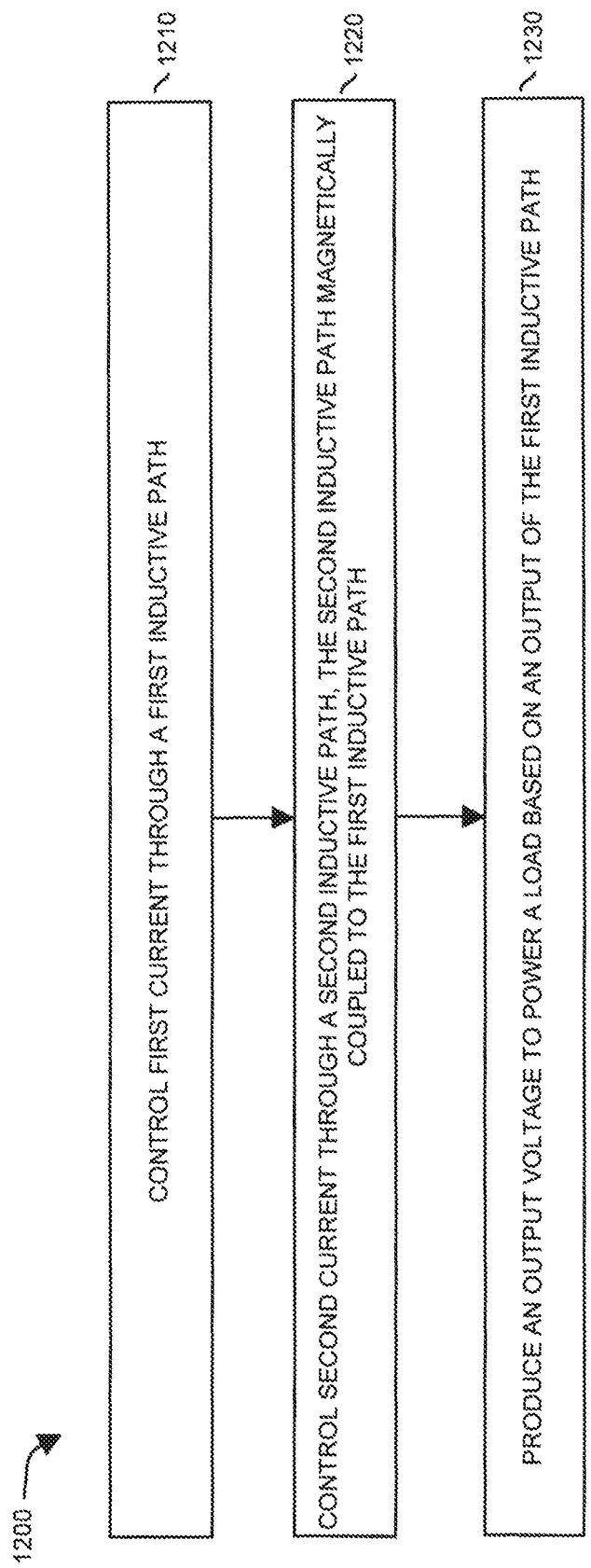
FIG. 10 is an example diagram illustrating a method according to embodiments herein.

Via function 922, the delta Iout signal is then used to calculate the required state and signals to operate the slope booster to drive the actual Iout (output current 130) to the new reference level (new current demand). In a manner as previously discussed, during the transient event, the slope booster control (master controller 940) takes over the buck control (of switches QA1 and QB1) and keeps its half bridge in either energizing state (adding magnetic energy from secondary inductive path 152 to primary inductive path 151) or de-energizing state (extracting magnetic energy from the primary inductive path 151 to secondary inductive path) depending on whether it is ramping up or ramping down as previously discussed. The master controller flow chart 1000 associated with the controller 940 is shown in FIG. 10 below.

FIG. 8 is an example diagram illustrating a flowchart of implementing the slope booster according to embodiments herein.

In processing operation 1010 of flowchart 1000, the controller 140 monitors one or more parameters such as the output voltage 123 and/or current outputted (output current 139) from the primary inductive path 151 to the load 118. If there is no change in the one or more parameters above a respective threshold value in processing operation 1010, the controller 140 operates the circuit 221 as a buck converter. For example, in processing operation 1020, the controller 140 generates control signals 111 to control switches QA1 and QB1; the controller 140 generates control signals 112 to deactivate switches Q1-Q4, disabling the slope booster 122-1.

Alternatively, in processing operation 1010, if the controller 140 detects a substantial load change associated with load 118 (such as a transient increase or decrease in current consumption in a window of time above a threshold value), control flow continues at processing operation 1030.

In processing operation 1030, the controller 140 determines whether to increase or decrease an amount of current through the primary inductive path 151. For example, in processing operation 1040, the controller 140 causes a flow of current in a first direction through the secondary inductive path 152, resulting in an increase of current through primary inductive path 151 to the load 118. Conversely, in processing operation 1050, the controller 140 causes a flow of current in a second direction through the secondary inductive path 152, resulting in a decrease of current through primary inductive path 151 to the load 118.

Figure 11:
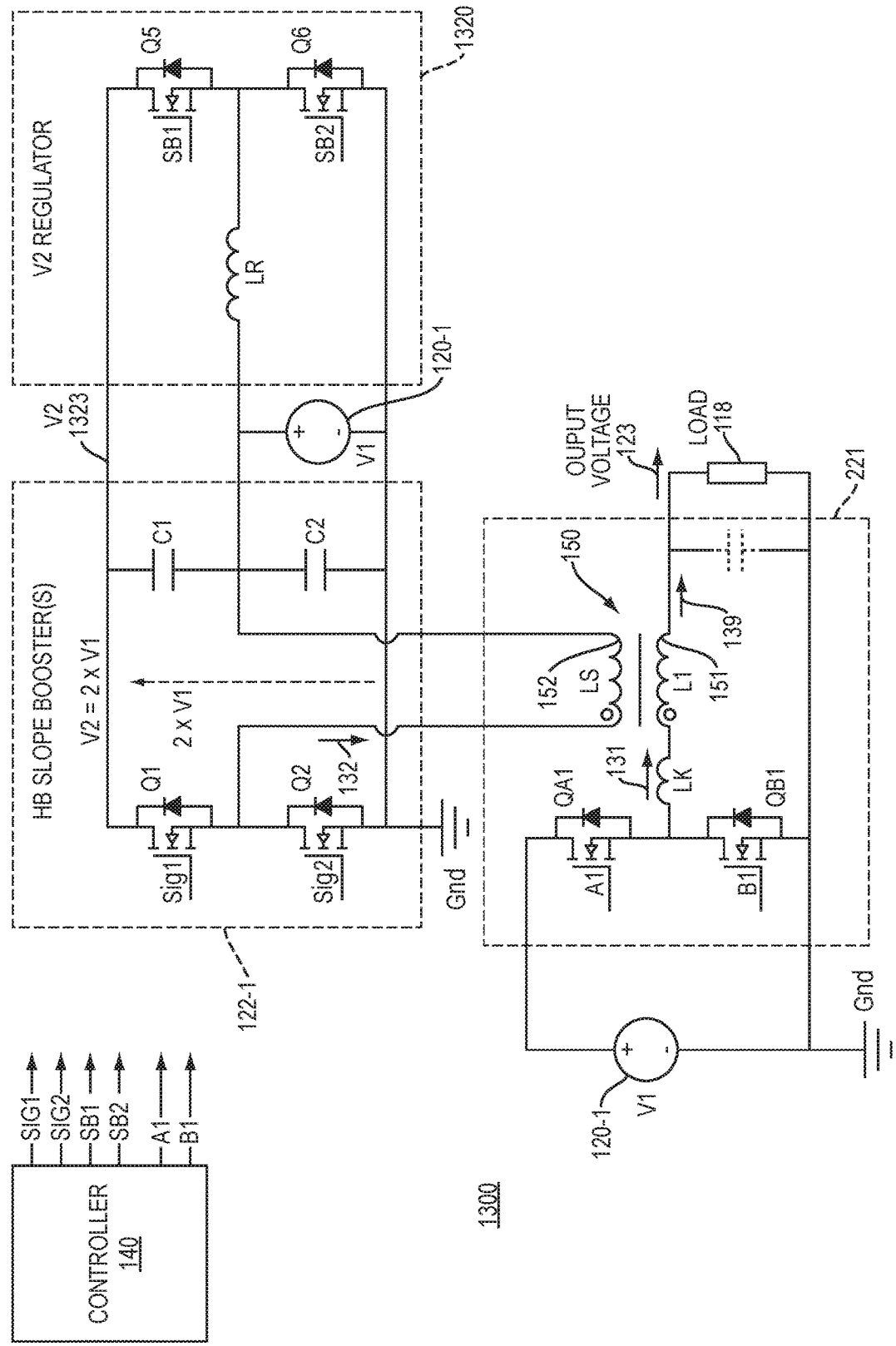
FIG. 11 is an example diagram illustrating slope booster current control according to embodiments herein.

FIG. 11 is an example diagram illustrating a power supply circuit according to embodiments herein.

In this example embodiment, the power supply 1300 includes phase 221, slope booster circuit 122-1 (such as a half bridge circuit as previously discussed), and voltage regulator 1320.

Voltage regulator 1320 includes switches Q5 and Q6 connected in series. During operation, voltage regulator 1320 produces voltage V2 outputted from node 1323. In one embodiment, the magnitude of the voltage V2 at node 1323 is twice a magnitude of the voltage V1. Although, note that the voltage at node 1323 can be any suitable value.

V2 regulator 1320 further includes inductor Lr. Via control of switches Q1, Q2, Q5, and Q6, the controller 140 produces the voltage V2 as well as controls a magnitude and direction of current provided by the source voltage V2 at node 1323 through the secondary inductive path 152.

In yet further embodiments, note that the V2 voltage regulator 1320 has the following properties: i) V2 regulator 1320 maintains the balance of C1 and C2 by using the same duty cycle in all conditions, therefore no regulation loop is necessary; ii) V2 regulator 1320 generates the V2 voltage at node 1323 (rail) automatically which is 2xV1; iii) V2 regulator 1320 only has to process the energy difference of C1 and C2 which is very small and therefore, SB1, SB2 can be high ohmic devices, LR can also relatively small; iv) with the V2 rail, all additional slope booster for each additional buck phases can be HB instead of FB which significantly reduces the total number of switches and control signals; v) capacitor C2 is connected directly to voltage V1 or decoupled with a diode to avoid reverse current flow.

Accordingly, in one embodiment, the power supply 1300 includes a voltage regulator 1320 operable to produce a second voltage V2 from the first voltage V1. First switches QA1 and QB1 control delivery of the input current 131 from the first voltage V1 to the primary inductive path 151. Second switches Q1, Q2, Q5, and Q6 control delivery of current through the secondary inductive path 152.

Figure 9:
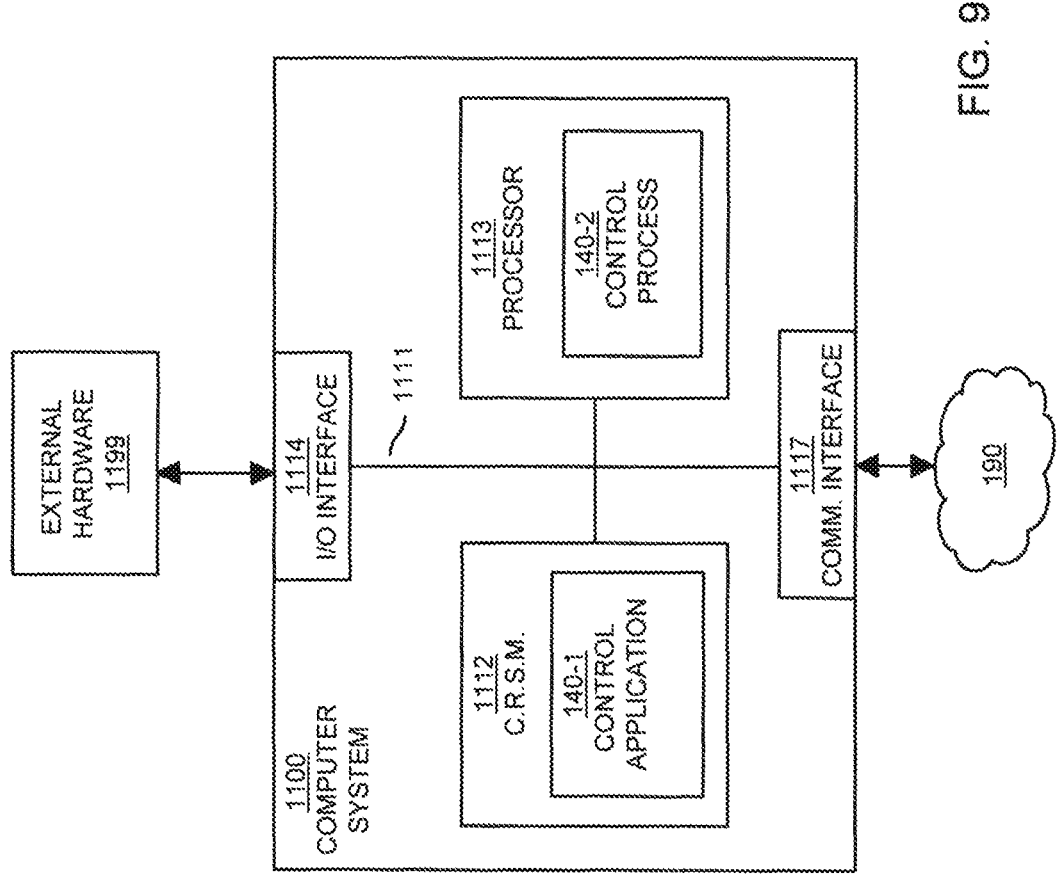
FIG. 9 is an example diagram illustrating example computer architecture operable to execute one or more methods according to embodiments herein.

FIG. 9 is an example diagram illustrating example computer architecture operable to execute one or more methods according to embodiments herein.

As previously discussed, any of the resources (such as controller 140, etc.) as discussed herein can be configured to include computer processor hardware and/or corresponding executable instructions to carry out the different operations as discussed herein.

As shown, computer system 1100 of the present example includes an interconnect 1111 that couples computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to external hardware 1199 such as a keyboard, display screen, repository, etc.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with trim application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in trim application 140-1 stored on computer readable storage medium 1112. Execution of the trim application 140-1 produces trim process 140-2 to carry out any of the operations and/or processes as discussed herein.

Those skilled in the art will understand that the computer system 1100 can include other processes and/or software and hardware components, such as an operating system that controls allocation and use of hardware resources to execute trim application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by one or more resources as described herein are discussed via flowchart in FIG. 10. Note that the steps in the flowcharts below can be executed in any suitable order.

FIG. 10 is a flowchart 1200 illustrating an example method according to embodiments herein. Note that there will be some overlap with respect to concepts as discussed above.

In processing operation 1210, the controller 140 controls first current through a first inductive path 151.

In processing operation 1220, the controller 140 controls second current 132 through a second inductive path 152; the second inductive path is magnetically coupled to the first inductive path 151.

In processing operation 1230, the inductive path 151 produces an output voltage 123 to power a load 118 based on an output 139 from the first inductive path 151.

Note again that techniques herein are well suited for use in switching power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A power supply comprising:
a primary inductive path;
a secondary inductive path;
a first switch;
a second switch; and
the primary inductive path coupled to receive input current from a power source, the secondary inductive path magnetically coupled to the primary inductive path to adjust current flow through the primary inductive path, the primary inductive path operable to produce an output voltage, the power supply further comprising:
a series circuit path in which the first switch, the secondary inductive path, and the second switch are connected in series, the first switch and the second switch operative to control a flow of current through the secondary inductive path.

2. The power supply as in claim 1, wherein the secondary inductive path is operative to modify an impedance of the first inductive path depending on a magnitude and direction of the flow of current passing through the secondary inductive path.

3. The power supply as in claim 1 further comprising:
a first set of switches, the first set of switches controlling delivery of the input current from the power source through the primary inductive path; and
a second set of switches, the second set of switches controlling delivery of current through the secondary inductive path, the second switches including the first switch and the second switch.

4. The power supply as in claim 3, further comprising:
a controller operable to control states of the first set of switches and the second set of switches based on comparison of the output voltage to a desired setpoint voltage.

5. The power supply as in claim 1 further comprising:
a controller, the controller operable to execute: i) a first mode of ramping up current through the secondary inductive path to accommodate a transient current consumption condition by a load powered by the output voltage, and ii) a second mode of ramping down current through the secondary inductive path to accommodate the transient current consumption condition by the load.

6. A system comprising:
a circuit board;
the power supply of claim 1, the power supply fabricated on the circuit board; and
a load, the load powered by the output voltage.

7. A method comprising:
receiving a circuit board; and
fabricating the power supply of claim 1 on the circuit board, the power supply operative to convey the output voltage to a load affixed to the circuit board.

8. The power supply as in claim 1, wherein the first switch is operative to connect a first node of the secondary inductive path to a first reference voltage; and
wherein the second switch is operative to connect a second node of the secondary inductive path to a second reference voltage.

9. The power supply as in claim 1, wherein the series circuit path is a first series circuit path, the power supply further comprising:
a third switch;
a fourth switch; and
a second series circuit path in which the third switch, the secondary inductive path, and the fourth switch are connected in series, the third switch and the fourth switch operative to control a flow of current through the secondary inductive path.

10. The power supply as in claim 9, wherein the first switch and the third switch are disposed in series; and
wherein the second switch and the fourth switch are disposed in series.

11. The power supply as in claim 9, wherein the first series circuit path controls a first directional flow of current through the secondary inductive path; and
wherein the second series circuit path controls a second directional flow of current through the secondary inductive path.

12. The power supply as in claim 1, wherein the flow of current through the secondary inductive path conveys energy to the primary inductive path.

13. A power supply comprising:
a primary inductive path;
a secondary inductive path;
a series circuit path in which a first switch, the secondary inductive path, and a second switch are connected in series, the first switch and the second switch being operative to control a flow of current through the secondary inductive path; and
the primary inductive path coupled to receive input current from a power source, the secondary inductive path magnetically coupled to the primary inductive path to adjust current flow through the primary inductive path, the primary inductive path operable to produce an output voltage; and
wherein a magnetic coupling coefficient between the primary inductive path and the secondary inductive path is between 0.5 and 0.96.

14. A power supply comprising:
a primary inductive path;
a secondary inductive path; and
the primary inductive path coupled to receive input current from a power source, the secondary inductive path magnetically coupled to the primary inductive path to adjust current flow through the primary inductive path, the primary inductive path operable to produce an output voltage, the power supply further comprising:
a first set of switches, the first set of switches controlling delivery of the input current from the power source through the primary inductive path;
second set of switches, the second set of switches controlling delivery of current through the secondary inductive path; and
a controller operable to control states of the first set of switches and the second set of switches based on comparison of the output voltage to a desired setpoint voltage, the controller further operable to selectively activate the second switches depending on a slope of the output voltage with respect to a threshold value.

15. A power supply comprising:
a primary inductive path;
a secondary inductive path;
the primary inductive path coupled to receive input current from a power source, the secondary inductive path magnetically coupled to the primary inductive path to adjust current flow through the primary inductive path, the primary inductive path operable to produce an output voltage; and
a controller operable to switch between: i) operation of the power supply in a first mode in which the primary inductive path produces the output voltage while no current flows through the secondary inductive path, and ii) operation of the power supply in a second mode in which the primary inductive path produces the output voltage while current flows through the secondary inductive path.

16. A power supply comprising:
a primary inductive path;
a secondary inductive path; and
the primary inductive path coupled to receive input current from a power source, the secondary inductive path magnetically coupled to the primary inductive path to adjust current flow through the primary inductive path, the primary inductive path operable to produce an output voltage;
wherein the primary inductive path is a first winding of a transformer, wherein the secondary inductive path is a second winding of the transformer, the power supply further comprising:
an inductor disposed in series with the first winding of the transformer;
wherein a coefficient of magnetic coupling between the primary inductive path and the secondary inductive path is greater than 0.9; and
the power supply further comprising: a first switch operative to connect a first node of the second winding to a first reference voltage; and
a second switch operative to connect a second node of the second winding to a second reference voltage.

17. A method comprising:
controlling first current through a first inductive path;
controlling second current through a second inductive path, the second inductive path magnetically coupled to the first inductive path;
producing an output voltage to power a load based on an output of the first inductive path; and
wherein controlling the second current through the second inductive path includes: controlling operation of both: i) a first switch coupled to a first node of the second inductive path, and ii) a second switch coupled to a second node of the second inductive path.

18. The method as in claim 17, wherein controlling the second current through the second inductive path adjusts a magnitude of the first current through the first inductive path.

19. The method as in claim 17, wherein the second current through the second inductive path increases an amount of current supplied by the first inductive path to the load.

20. The method as in claim 17, wherein the second current through the second inductive path reduces an amount of current supplied by the first inductive path to the load.

21. The method as in claim 17, wherein the first inductive path is a first winding of a transformer; and
wherein the second inductive path is a second winding of the transformer.

22. The method as in claim 17, further comprising:
controlling delivery of an input current from a power source to the first inductive path via control of a first set of switches; and
controlling delivery of the second current through the second inductive path via control of a second set of switches, the second set of switches including the first switch and the second switch.

23. The method as in claim 17 further comprising:
switching between: i) a first mode in which the first inductive path produces the output voltage while no current flows through the second inductive path, and ii) a second mode in which the first inductive path produces the output voltage while current flows through the second inductive path.

24. The method as in claim 17, wherein the second inductive path is disposed in a series circuit path including the first switch and the second switch, the second current flowing through a combination of the first switch, the second inductive path, and the second switch.

25. The method as in claim 24, wherein controlling the second current through the series circuit path includes:
simultaneously controlling switching operation of both the first switch and the second switch.

26. The method as in claim 17, wherein the second current through the second inductive path conveys energy from the second inductive path to the first inductive path.

27. Computer-readable storage hardware having instructions stored thereon, the instructions, when carried out by computer processor hardware, cause the computer processor hardware to:
control first current through a first inductive path;
control second current through a second inductive path, the second inductive path magnetically coupled to the first inductive path; and
produce an output voltage to power a load based on an output of the first inductive path; and
wherein control of the second current through the second inductive path includes: control of both: i) a first switch coupled to a first node of the second inductive path, and ii) a second switch coupled to a second node of the second inductive path.

28. A power supply comprising:
a primary inductive path, the primary inductive path receiving first current from a power source;
a secondary inductive path, the secondary inductive path magnetically coupled to the primary inductive path, the secondary inductive path driven with second current; and
a controller operative to adjust an impedance of the primary inductive path via control of a magnitude of the second current through the secondary inductive path, the controller further operative to control bidirectional flow of the second current through the secondary inductive path;
wherein the controller is operative to control a flow of the second current in a first direction through the secondary inductive path to maintain a magnitude of an output voltage above a first threshold value; and
wherein the controller is operative to control the flow of the second current in a second direction opposite the first direction to maintain the magnitude of the output voltage below a second threshold value.

29. The power supply as in claim 28, wherein flow of the second current through the secondary inductive path conveys energy from the secondary inductive path to the primary inductive path.

30. The power supply as in claim 29, wherein the flow of the second current through the secondary inductive path increases a magnitude of the first current through the primary inductive path.

31. The power supply as in claim 29, wherein the flow of the second current through the secondary inductive path reduces a magnitude of the first current through the primary inductive path.

32. The power supply as in claim 28, wherein the primary inductive path is a first winding of a transformer and the secondary inductive path is a second winding of the transformer, the first winding and the second winding having a magnetic coupling coefficient of between 0.5 and 0.96.

* * * * *